No. 863,201. PATENTED AUG. 13, 1907.
C. T. MOSMAN.
MEANS FOR PROTECTING DYNAMO ELECTRIC MACHINES.
APPLICATION FILED FEB. 6, 1903.
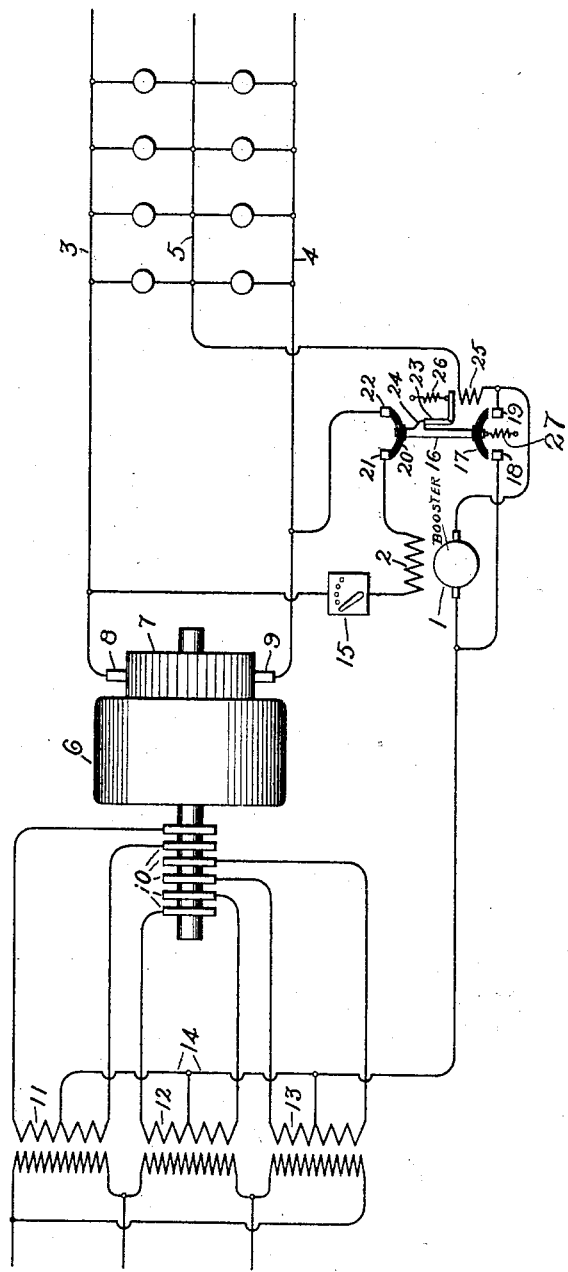
Witnesses.
George H. Tilden.
Helen Oxford
Inventor.
Charles T. Mosman.
by Albert G. Davis
Att'y.

UNITED STATES PATENT OFFICE.

CHARLES T. MOSMAN, OF SCHENECTADY, NEW YORK, ASSIGNOR TO GENERAL ELECTRIC COMPANY, A CORPORATION OF NEW YORK.

MEANS FOR PROTECTING DYNAMO-ELECTRIC MACHINES.

No. 863,201.

Specification of Letters Patent.

Patented Aug. 13, 1907.

Application filed February 6, 1903. Serial No. 142,123.

*To all whom it may concern:*

Be it known that I, CHARLES T. MOSMAN, a citizen of the United States, residing at Schenectady, in the county of Schenectady, State of New York, have invented certain new and useful Improvements in Means for Protecting Dynamo-Electric Machines, of which the following is a specification.

My invention is intended particularly to provide means for protecting boosters or similarly connected machines from the effects of excessive flows of current. The booster to which my invention is capable of application may be connected in any one of a large variety of ways. Thus, for example, the booster may be connected in series with the neutral or common return conductor of a three-wire system of that type in which the two outside mains are derived from the direct current terminals of a rotary converter or double current generator, the neutral extending from a point of neutral potential on the alternating-current system. The booster may have its armature connected in a series with the neutral conductor and may be driven by the shaft of the generator or rotary converter or by some separate source of power. It may be either series wound or separately excited from any suitable source of current, as for example by current derived from the direct current mains to which it is related.

When the booster is connected to a multiple conductor system of the type described, or indeed to any one of a number of other well known systems, it may happen that the occurrence of a short circuit on the system, as for example between the neutral conductor and one of the outside mains, may cause an excessively large current to flow in the neutral conductor with resulting serious damage to the commutator and windings of the booster connected thereto. I have therefore provided means to protect the booster from such excessive currents. For this purpose I make use of a novel device for automatically shunting the armature of the booster, thereby diverting the heavy current which would otherwise flow through the armature, and for depriving the field of the booster of its excitation in order to prevent the booster from feeding current around through the shunt.

The novel features which I believe are characteristic of my invention I have endeavored to point out with particularity in the appended claims while the invention itself, as illustrated by one of the numerous embodiments of which it is capable, I have described in some detail in the following specification which is to be taken in connection with the accompanying drawing representing in diagram the particular embodiment referred to.

In the drawing the booster is represented with its armature at 1 and its field winding at 2, the booster in this particular instance having its field separately excited. The system in connection with which the booster is operated is in the present instance a three-wire system having mains 3, 4 and a neutral conductor 5, the mains 3 and 4 receiving current directly from the direct current end of a rotary converter, the armature of which is represented at 7. The brushes 8 and 9 which bear on the commutator are connected directly to the mains 3, 4 of the three-wire system as indicated. The alternating current is supplied to the rotary converter through six collector rings 10, the current being derived, in the present instance, from the three secondaries 11, 12 and 13 of a set of three-phase transformers. Each secondary has its terminals connected through a corresponding pair of collector rings to points in the armature winding of the rotary separated from each other by 180° in phase, the points of connection of the respective secondaries being angularly displaced from each other in such manner as to produce a six-phase flow of current in the alternating-current leads. This mode of connection is well understood in the art and requires therefore no further description. The neutral conductor 5, to which reference has already been made, is connected to the neutral point on the alternating-current system afforded by the middle points of the transformer secondaries which are joined electrically together by the conductor 14 by means of which the junction with the neutral is effected.

The armature 1 of the booster, which is connected in series with the neutral conductor 5, may be driven in any suitable manner, either by direct or belt connection to the armature 6 of the rotary converter or from any other suitable source of power. The field winding 2 is excited in the present instance by connection across the mains 3, 4 of the three-wire system, the current in the windings being regulated by a rheostat 15. If desired, a reversing switch may also be provided in order that the current in the booster field may be reversed as well as regulated in value.

In order to protect the booster from the effects of excessive current in the neutral conductor 5 I provide an automatic switch adapted, upon the flow of excessive current in the neutral conductor, to short-circuit the armature of the booster and open-circuit its field. Various mechanical arrangements may be utilized for this purpose without departing from my invention, one arrangement however being shown in the drawing for purposes of illustration. In the particular arrangement shown, a contact-carrying member 16 is provided, bearing at its lower end a bridging contact 17 adapted to short-circuit two fixed contacts 18 and 19 connected respectively to the terminals of the armature 1 of the booster, the engagement of the bridging contact with these fixed contacts 18 and 19 therefore operating to short-circuit the armature. The contact-carrying member 16 also carries a bridging contact 20 coöperating with two fixed contacts 21 and 22 to complete the circuit of the field winding 2 during normal operation of the system.

A spring-retracted latch 23 operates by engagement with a lug or detent 24 on the contact-carrying member to hold the latter in its normal or upper position as shown, in which position, as will be seen, the field magnet circuit of the booster is closed through the bridging contact 20, the circuit about the armature 1 remaining open. The actuating magnet or coil 25 in series with the neutral conductor 5 operates upon one arm of a latch 23, which serves as an armature, and causes the latch to be disengaged from the detent 24 whenever the current in the neutral conductor becomes sufficient to overcome the force of a retracting spring 26 which may be adjustable in order to adjust the mechanism so as to trip at or above any desired current value. As soon as the latch is tripped, the current-carrying member 16, hastened or accelerated in its action by a spring 27, suddenly drops, thereby short-circuiting the armature 1 and opening the circuit of the field 2. Current is thus prevented from injuring the commutator or armature windings of the booster.

Of course any other suitable known method of annulling the field magnetization of the booster may be employed as circumstances may indicate. To one skilled in the art numerous modifications will be apparent.

What I claim as new and desire to secure by Letters Patent of the United States, is—

1. The combination with a conductor of an electric system, of current consuming means connected thereto, a dynamo electric machine having an armature in series with said conductor, and means operative upon an excessive flow of current in said conductor for diverting current from said armature.

2. The combination with a conductor of an electric system, of a dynamo-electric machine in circuit therewith, means for forming a path for the passage of current in said conductor around said machine, and means for preventing said machine from setting up a flow of current of its own through said path.

3. The combination with a conductor of an electric system, of a dynamo-electric machine having its armature in series with said conductor, a field winding for said machine, means for short-circuiting said armature, and means for withdrawing current from said field winding.

4. The combination in an electric system, of a dynamo-electric machine having its armature normally in series with one of the conductors of said system, means for short-circuiting said armature, and means for preventing the generation of current by said armature when thus short-circuited.

5. The combination of a booster, and means for short-circuiting its armature and demagnetizing its field.

6. The combination of an electric system, a booster connected to said system, and means responsive to the flow of current in said system for short-circuiting the armature of said booster and demagnetizing its field.

7. The combination of a booster, means for short-circuiting the armature of said booster, and means for preventing the generation of current by said armature when thus short-circuited.

8. The combination of a three-wire system, a booster having its armature in series with the neutral conductor of said system, means for shunting the armature of said booster when the current in said neutral conductor becomes excessive, and means for preventing the generation of current by said armature.

9. The combination of a three-wire system, a booster having its armature in series with the neutral conductor of said system, and means for diverting current from said armature when the current in said neutral conductor becomes excessive.

10. The combination of an electric system, a translating device or devices in circuit therewith, a booster having its armature in series with a conductor of said system, and means for automatically short-circuiting said armature when the current in said conductor becomes excessive.

11. The combination of a three-wire system, a booster having its armature in series with the neutral conductor of said system, and an automatic circuit-changing device for short-circuiting said armature when the current in said neutral conductor becomes excessive.

12. The combination of a dynamo-electric machine having an armature provided with a commutator and collector rings, a three-wire system having its mains connected to the direct current end of said machine and its neutral conductor to a point of neutral potential on the alternating-current system to which said machine is connected, a booster having its armature in series in said neutral conductor, and its field winding connected so as to derive current from said three-wire system, and an automatic circuit controlling device responsive to current in said neutral conductor for short-circuiting said booster armature and opening the circuit of said field when the current in said neutral conductor equals or exceeds a predetermined amount.

In witness whereof, I have hereunto set my hand this 4th day of February, 1903.

CHARLES T. MOSMAN.

Witnesses:
BENJAMIN B. HULL,
HELEN ORFORD.